Aug. 5, 1958 G. A. MORRELL, JR 2,846,519

APPARATUS FOR PSEUDO-STEREOPHONIC SOUND REPRODUCTION

Filed Oct. 22, 1954 2 Sheets-Sheet 1

INVENTOR

GEORGE ARTHUR MORRELL, JR.

BY Francis J. Klempay

ATTORNEY

Aug. 5, 1958 G. A. MORRELL, JR 2,846,519

APPARATUS FOR PSEUDO-STEREOPHONIC SOUND REPRODUCTION

Filed Oct. 22, 1954 2 Sheets-Sheet 2

INVENTOR
GEORGE ARTHUR MORRELL, JR.

BY Francis J. Klempay
ATTORNEY

United States Patent Office 2,846,519

Patented Aug. 5, 1958

2,846,519

APPARATUS FOR PSEUDO-STEREOPHONIC SOUND REPRODUCTION

George Arthur Morrell, Jr., Conneaut, Ohio, assignor to The Astatic Corporation, Conneaut, Ohio, a corporation of Ohio Application October 22, 1954, Serial No. 463,946

3 Claims. (Cl. 179—100.4)

Figure 1A:
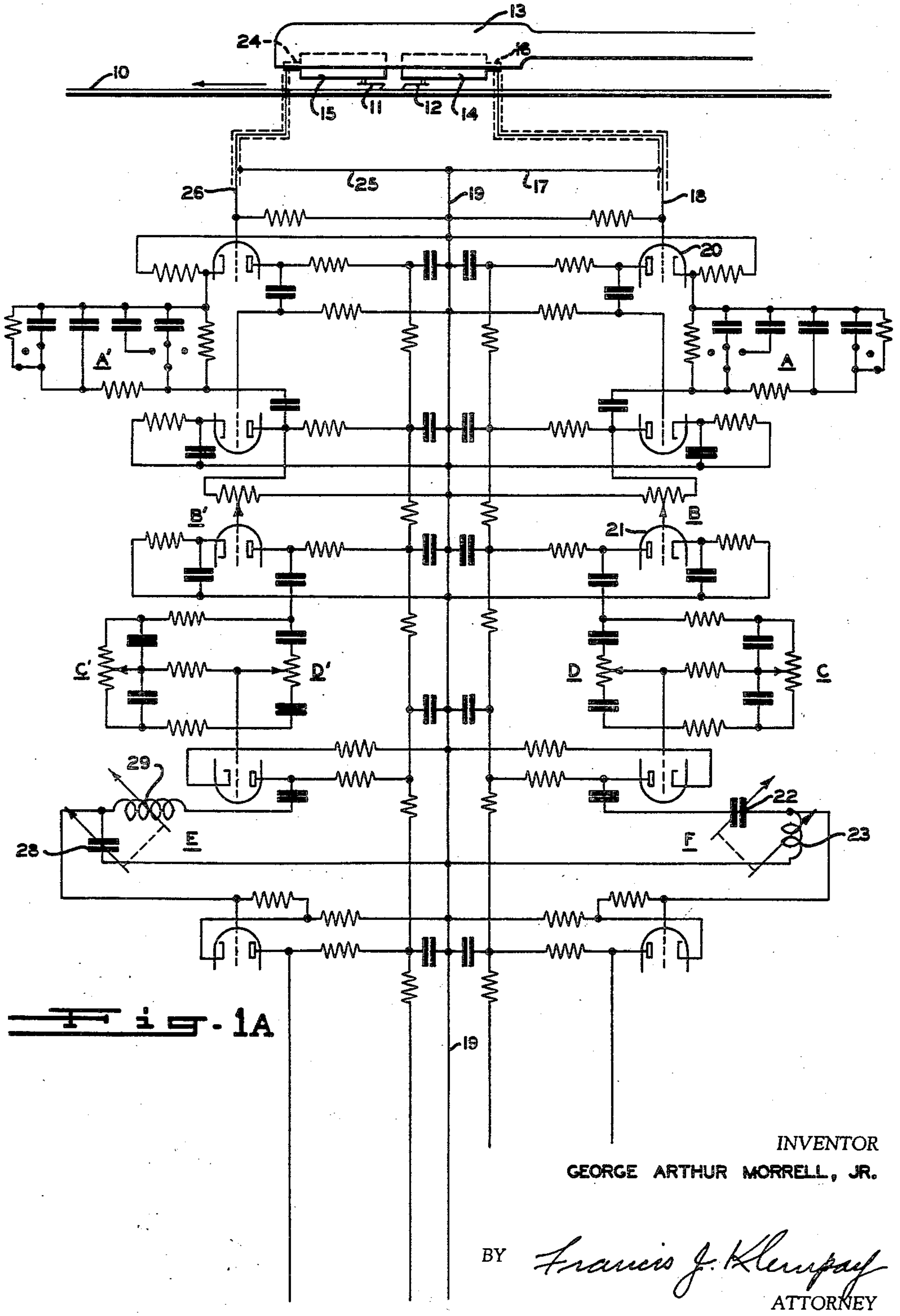

The present invention relates generally to the art of electronic sound reproduction, and has particular reference to the reproduction of sound through the medium of phonograph records and the like.

As an overall object the present invention seeks to provide a novel and improved method of and apparatus for reproducing sound from phonograph records and the like in a unique and improved manner.

More specifically, it is an object of the invention to provide a novel method of and apparatus for phonographic reproduction whereby a unique and pleasing three-dimensional sound effect is obtained. The invention, in its primary sense, contemplates the use of a conventional phonograph, tape recorder, or the like having a single sound track or groove, and the novel and improved processing and channeling of the sound-producing stimuli of such sound track or groove so that the resulting audible energy is delivered at spaced points in a room or area, the energy so separately delivered being separately classified according to frequency and/or loudness range in such manner as to create the effect that the separately classified sounds emanate from separate sources. The thus produced sound is particularly unique and effective in the reproduction of music, for example, where the notes of the high-toned instruments, such as violins, clarinets and the like appear to emanate from one point while the lower notes of the bass instruments appear to emanate from another point. The overall effect is of a three dimensional or so-called stereophonic nature.

Of course, stereophonic or pseudo-stereophonic sound reproduction is not new in any broad sense. It is common in many motion picture theaters and the like to provide a number of separately positioned loud speakers, controlled by means of a like number of separate sound tracks, so that the blended sound has highly effective three dimensional qualities. In such cases the positioning of the loud speakers corresponds generally with the positioning of the microphones employed in initially recording the sounds. This same general system has also been applied to the phonographic arts in the so-called binaural system wherein a special recording disc is provided with two sound tracks or grooves, taken from separate spaced microphone pick-up devices, and played by means of a special tone arm having separate spaced stylii adapted to follow the parallel grooves. All of these systems require considerable equipment of a highly specialized nature so that the use of such systems in the average home is practically precluded. On the other hand, it is one of the special objects of this invention to provide a novel system, including the method and required apparatus which requires an absolute minimum of specialized equipment and which may be used in connection with conventional single track recording discs or tapes.

A more specific object of this invention is the provision of a novel pseudo-stereophonic sound system wherein a plurality of time displaced stimuli are taken from a conventional single track recording disc or tape and separately classified into predetermined frequency ranges and caused to be emitted as audible energy as spaced points in a listening area, the combined effect of the frequency range separation and time displacement of the energy so emitted being such as to provide a unique resonant sound having strikingly realistic three-dimensional qualities.

Yet another specific object of this invention is the provision of a novel apparatus for obtaining and classifying sound stimuli from conventional recording media in the desired manner.

The above and other objects and advantages of the invention will become apparent upon full consideration of the following detailed specification and accompanying drawing wherein is shown a certain preferred embodiment of the invention. Reference may also be had to my related co-pending application Ser. No. 463,947, filed October 22, 1954, for "Phonograph Tone Arm for Pseudo-Stereophonic Sound Reproduction," for further ramifications of the invention herein described.

Figures 1B, 2:
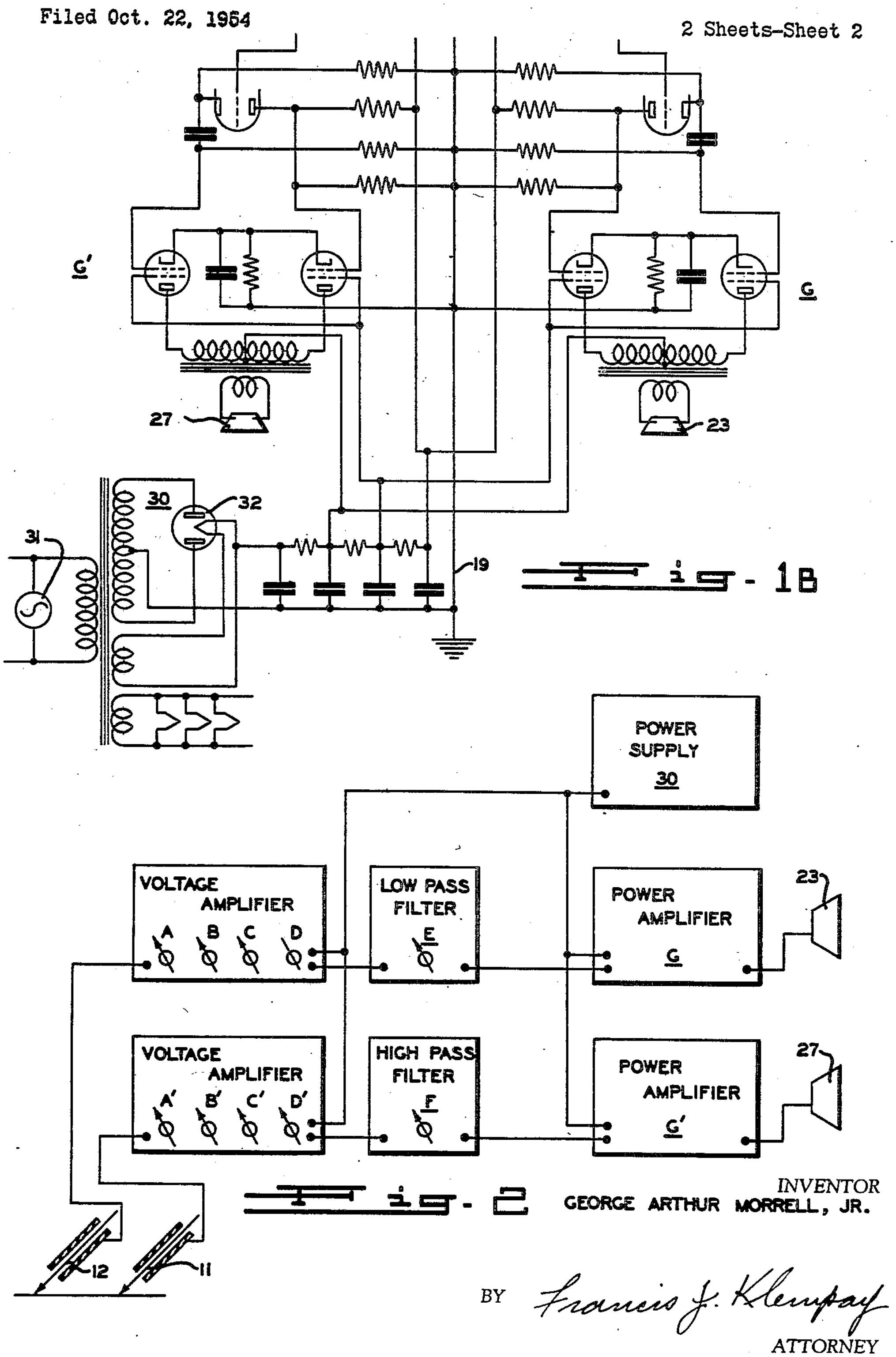

In the drawing:

Figure 1, shown in parts 1*a* and 1*b*, is a schematic diagram of a circuit which may be incorporated in the system of my invention; and Figure 2 is a simplified block diagram of the system and circuit of Figure 1.

Referring now to the drawing, the reference numeral 10 designates a conventional single track recording disc, the track or groove of which is engaged in the same convolution by a pair of spaced stylii 11 and 12 of a tone arm 13, the latter preferably being of the type disclosed and claimed in my before mentioned co-pending application. In accordance with the teachings of this and my related co-pending application the stylii 11 and 12 are spaced so that the first contacted stylus 12 will cause a first signal to be generated in a suitable transducer cartridge 14, while the second stylus 11, associated with a second transducer cartridge 15, will cause an identical or substantially identical signal to be generated in time delayed relation to the first signal.

Transducer assembly 14 is provided with output terminals 16 feeding conductors 17 and 18, the first mentioned of which conductors may be connected directly to ground by means of ground conductor 19. The second of the conductors, conductor 18, is connected to the grid of a vacuum tube 20, forming part of an "equalizer" circuit designated generally by the letter A. The equalizer circuit A, in and of itself, is more or less conventional and functions to properly attune and assimilate the electrical signals generated within the cartridge 14.

Connecting the output stage of the equalizer A is a conventional gain control circuit B, including vacuum tube 21, which in turn feeds into a tone control circuit C—D which is of conventional design and provides base and treble tone adjustment in the manner desired.

In accordance with the teachings of the invention, the output of the circuitry above described is fed into a filter circuit F, comprising variable capacitor and inductor components 22 and 23 which are preferably mechanically interconnected so that both components may be adjusted by means of a single control knob or lever. The filter F, in the illustrated circuit, is a "high pass" filter; that is, it is designed to pass signals having frequency values equal to or greater than a predetermined adjustable value, while substantially blocking signals of lower frequency.

Those signals which are passed through the filter F are then fed into a power amplifier circuit G and thence to a speaker 23 for audible reproduction. The speaker 23 is suitably located in a listening room, not shown.

Signals generated by the second transducer assembly 15 are fed through terminals 24 and conductors 25 and 26 into a separate circuit comprised of an equalizer A′, gain control B′, tone control C′—D′, filter E, power amplifier G′ and speaker 27, the entire circuit being grounded to conductor 19 in the preferred embodiment. The filter E, in accordance with the teachings of the invention is a "low pass" filter, comprising interconnected capacitor and inductor components 28 and 29 which are arranged to pass signals of lower than a predetermined adjustable frequency value.

A common power supply 30, including a source of commercial A. C. power 31, and rectifier 32 is employed to drive the entire system, the output of rectifier 32 being connected to the common ground conductor 19 and to the positive sides of each of the various sub-circuits heretofore described.

Speaker 27 is arranged in the listening room at a point remote from the first described speaker 23 so that the sounds emitted from each approach the listener from different directions; and it will be readily understood that the sounds emanating from the speaker 23 will be principally comprised of high tones or frequencies, while the sounds emanating from speaker 27 will be comprised of low tones or frequencies. With the circuit properly adjusted the upper frequency limit of the low pass filter E will equal or slightly exceed the lower frequency limit of the high pass filter F so that the entire operative frequency range is encompassed. And in some cases it may be desirable to so adjust the respective filters E and F as to effect a considerable overlapping of the frequency ranges, depending upon the particular tastes of the listener and the nature of the recording to be reproduced.

In any instance the sounds emitted from the speaker 23 will lead corresponding sounds emitted from the speaker 27 by a matter of a fractional second in time, approximately 100th of a second, and this, combined with the fact that the sounds are separately classified as to frequency range and directed at the listener from different directions, is productive of a highly unique and pleasing sound effect not unlike true stereophonic reproduction. The effect is particularly noticeable in the reproduction of music, where as a general rule many of the separate musical instruments are played within a range of frequencies within the range of either the low pass or high pass filters E and F. And, of course, the "crossover" level and the degree of overlapping of the frequency ranges may be readily adjusted by manipulating the adjustable filter circuits so that the various types of music and orchestration may be reproduced with optimum effectiveness in all cases.

It will of course be readily observed that the apparatus required in my improved system is of a standard or conventional nature, for the most part, so that the equipment may be installed and enjoyed at nominal expense.

Of course, the system herein specifically illustrated and described is capable of modification without departing from the clear teachings of the invention. Reference should therefore be made to the following appended claims in determining the full scope of the invention.

I claim:

1. Apparatus for reproducing sound from a medium having a single sound track comprising a pair of spaced members arranged in detecting relation to said single sound track and adapted to derive separate sound-producing stimuli therefrom in timed relation, means to separately amplify and filter said separate stimuli, said last mentioned means including adjustable filter circuits having outputs of limited frequency range, one of said ranges being relatively high while the other of said ranges is relatively low, said high and low ranges combining to comprise the whole of the range of reproduction, and separate spaced means associated with said separate means to amplify and filter for separately audibly reproducing said stimuli in timed relation.

2. Apparatus for reproducing sound from a medium having a single sound track comprising a plurality of spaced members arranged in detecting relation to said single sound track and adapted to derive separate sound-producing stimuli therefrom in timed relation, means to separately filter said separate stimuli to limit the range of frequency of the signals constituting the same, and separate spaced means associated with said last mentioned means to audibly reproduce the thus filtered separate stimuli in timed relation.

3. Apparatus according to claim 2 further characterized by said medium comprising a conventional single-groove phonograph record, and said plurality of spaced members comprising a pair of groove-engaging stylii adapted to engage a single convolution of said groove in spaced leading and trailing relation.

References Cited in the file of this patent

UNITED STATES PATENTS

| | | |
|---|---|---|
| 1,203,190 | Fritts | Oct. 31, 1916 |
| 1,468,455 | Bristol | Sept. 18, 1923 |
| 1,642,040 | McCutchen | Sept. 13, 1927 |
| 1,859,423 | Arnold | May 24, 1932 |
| 2,014,528 | Keller | Sept. 17, 1935 |
| 2,327,956 | Begun | Aug. 24, 1943 |

FOREIGN PATENTS

| | | |
|---|---|---|
| 737,328 | Germany | June 3, 1943 |